(12) United States Patent
Lee et al.

(10) Patent No.: US 6,798,833 B2
(45) Date of Patent: Sep. 28, 2004

(54) VIDEO FRAME COMPRESSION/DECOMPRESSION HARDWARE SYSTEM

(75) Inventors: Tae-Young Lee, Ichon-shi (KR); Yong-Sik Kim, Ichon-shi (KR); Sung-Jae Jang, Ichon-shi (KR); Hoon Yoo, Ichon-shi (KR); Je-Chang Jeong, Ichon-shi (JP)

(73) Assignee: Hynix Semiconductor Inc., Ichon-Shi (KR)

( * ) Notice: Subject to any disclaimer, the term of this patent is extended or adjusted under 35 U.S.C. 154(b) by 516 days.

(21) Appl. No.: 09/938,855

(22) Filed: Aug. 27, 2001

(65) Prior Publication Data

US 2002/0163965 A1 Nov. 7, 2002

(30) Foreign Application Priority Data

May 7, 2001 (KR) .................................... 2001-24613

(51) Int. Cl.[7] .............................. H04N 7/12; H04B 7/66
(52) U.S. Cl. ................................................ 375/240.03
(58) Field of Search ................ 375/240.01, 240.02, 375/240.03, 240.04, 240.05, 240.1, 240.12, 240.13, 240.14, 240.15, 240.18; 382/232, 233, 234, 230, 238; 706/21; H04N 7/12; H04B 1/66

(56) References Cited

U.S. PATENT DOCUMENTS 5,838,597 A 11/1998 Pau et al.
5,923,375 A 7/1999 Pau
5,929,911 A 7/1999 Cheney et al.
5,960,116 A * 9/1999 Kajiwara .................... 382/238
6,560,365 B1 * 5/2003 Nakayama et al. ......... 382/233
6,704,718 B2 * 3/2004 Burges et al. ................ 706/21

FOREIGN PATENT DOCUMENTS

| JP | A-9-212486 | 8/1997 |
|----|------------|--------|
| JP | A-10-4550  | 1/1998 |
| JP | A-10-224805 | 8/1998 |

OTHER PUBLICATIONS

Tae Young Lee et al.; "A Low-Complexity Frame Memory Compression Algorithm and Its Implementation for MPEG-2 Video Decoder"; The Second IEEE Asia Pacific Conference on ASICs; Aug. 28-30, 2000; pp. 103-106.

* cited by examiner

Primary Examiner—Tung T. Vo
(74) Attorney, Agent, or Firm—Jacobson Holman PLLC

(57) ABSTRACT

A system performing compression and decompression of video frame comprises a compression system, including an input control unit, a frequency transforming unit, a quantization and Rice mapping unit, a bit count combination unit, an encoding and an output control unit. The system also includes a decompression system, including a decompression input control unit, a decoding unit, an inverse quantization and inverse Rice mapping unit, an inverse frequency transforming unit and a decompression output control unit.

19 Claims, 16 Drawing Sheets

VIDEO FRAME COMPRESSION/DECOMPRESSION HARDWARE SYSTEM

BACKGROUND OF THE INVENTION

1. Field of the Invention

The present invention relates to a video frame compression/decompression hardware system; and, more particularly, to a video frame compression/decompression hardware system for reducing an amount of memory.

2. Description of the Prior Art

In U.S. Pat. No. 5,838,597 to Pau et al, a method for reducing memory by optimizing an amount of the static memory required by an MPEG-2 decoder by using an adaptive differential pulse code modulation (ADPCM) technique is disclosed. The MPEG-2 video decoder ("video core" of the integrated system) accesses an external DRAM memory through an interfacing memory data bus, which can be also shared by an MPEG audio decoder core for accessing each audio buffer that may be organized in the same external DRAM. The video decoder may also include a controller for the management synchronisms.

According to a conventional MPEG-2 architecture, the decoder comprises a first-in-first-out (FIFO) buffer, for instance with a capacity of 1 Kbits for the acquisition and the writing of compressed data of the external DRAM, a start code detector, a memory bi-directional buffer for an on screen display (OSD) and a first variable length decoder for the compressed input data stream. The MPEG-2 discrete cosine transform (DCT) data decompression is carried out by the relative decompression units including a pipeline typically having a "run-length" decoding stage, an inverse quantization circuit, an inverse discrete cosine transform (I_DCT) processor and a network for the generation or construction of a predictor value.

In a known architecture, the blocks of I_DCT data output by the I_DCT processing circuit that calculates the inverse discrete cosine transform and the motion compensation, relative to the I, P and B pictures, were written in the respective buffers of the external memory in a coded form, that is, in the form of words of a certain number of bits before being decoded and sent to the display unit. By contrast, according to U.S. Pat. No. 5,838,597 to Pau et al, the decompressed I_DCT data relative to the I and P pictures are recompressed according to an ADPCM scheme before being coded and written in the respective buffer of the external memory. This is affected by means of an ADPCM coder. The recompressed data are thereafter decoded and decompressed by means of the ADPCM decoder in order to be sent to the display unit, together with decompressed B-pictures. Optionally, an internal auxiliary memory may be realized to optimize the management of the external memory as described hereinafter. In one preferred case of a "direct" reconstruction of the B-pictures, this is then realized as follows: the ADPCM compressed I and P predictors are read by the external DRAM memory and ADPCM decompressed in order to perform motion compensation of the B-picture that is currently being MPEG-2 decompressed by the pipeline.

FIG. 1 is a block diagram illustrating the recompression and the ADPCM encoder according to the cited U.S. Pat. No. 5,838,579 to Pau et al.

The ADPCM encoder comprises a 64*8 bit buffer (block buffer), a dedicated circuit (variance estimator), a ROM, a programmable logic array (PLA), a quantizer, a limiter circuit and a multiplexer.

The block buffer acquires the I_DCT input data and the variance estimator calculates the average pels value of each sub-block of the I_DCT input data and the average of the sum of the absolute values of the differences between each pel of the I_DCT data sub-block. Coefficients of quantization are stored in the ROM (non-volatile). The PLA receives, as an input, a certain variance value and outputs values of the required coefficients.

However, U.S. Pat. No. 5,838,579 to Pau et al does not disclose a hardware, which can pack seven codes having variable length into segments of fixed length and vice-versa. Also, 75% compression ratio is not disclosed, or a technique for simultaneously performing quantization. Additionally, Rice mapping is not mentioned so that optimization of an integrated circuit in the compression and decompression hardware cannot be achieved and it a takes long processing time.

FIG. 2 is a block diagram illustrating a quantization unit in a video frame compression and decompression hardware.

The quantization unit includes a first converting unit 210, a quantizer 220 and a second converting unit 230.

The first converting unit 210 includes a first sign reverser 213 and a multiplexer 211. If frequency transformed coefficients are a positive sign (MSB is '0'), the coefficients are inputted in a positive part of the multiplexer 211. If frequency transformed coefficients are a negative sign (MSB is '1'), the coefficients are inputted to the first sign reverser 213 and then the sign is reversed into a positive sign. The sign reversed coefficients are inputted into a negative part of the multiplexer 211. The coefficients passed through the first converting unit 210 are inputted into the quantizer 220 and then quantized. The quantized coefficients have original signs as passing through the second converting unit 230.

FIG. 3 is a diagram illustrating a Rice mapping unit in a video frame compression and decompression hardware.

The Rice mapping unit performs Rice mapping for the quantized coefficients. Two times operation, as performing 1-bit left shift, is performed for the qunatized coefficients and the positive reversion for qunatized coefficients originally having a negative sign is followed by subtraction of one, which is implemented by bit inverting. If the original sign of the Rice mapped coefficients before quantization is positive, the Rice mapped coefficients are inputted into a positive part of a multiplexer and if the original sign is negative, the Rice mapped coefficients are inputted into a negative part of the multiplexer.

SUMMARY OF THE INVENTION

It is, therefore, an object of the present invention to provide a video frame compression/decompression hardware system for reducing an amount of memory.

In accordance with an aspect of the present invention, there is provided a system performing compressing of a video frame, comprising: input control means for receiving and aligning data to be compressed; frequency transforming means for performing 1-dimensional and/or 2-dimensional frequency transformations of the data received from the input control; quantization and Rice mapping means for performing quantization and Rice mapping the transformed data outputted from the frequency transformation means; bit count combination means for calculating bit count for the quantized and Rice mapped data and for selecting one quantization value among the quantization values outputted from the quantization and Rice mapping means according to results of the bit count; encoding means for performing Golomb-Rice (GR) coding for the quantized and Rice mapped data and for packing the GR coded values, a DC value and the quantiztion value into a compression segment; and output control means for outputting the packed values.

In accordance with another aspect of the present invention, there is provided a system performing decompression of a video frame, comprising: input control means for receiving data to be decompressed; decoding means for unpacking the data and for performing Golomb-Rice (GR) decoding for the unpacked data; inverse Rice mapping and inverse quantization means for performing inverse Rice mapping for the GR decoded data and performing inverse quantization for the inverse Rice mapped data; inverse frequency transforming means for performing inverse 1-dimensional and/or 2-dimensional frequency transformation for the inverse Rice mapped and the inverse quantized data; and decompression output control means for outputting the desired pixels from the finally decompressed pixels obtained by the inverse frequency transformation.

In accordance with further aspects of the present invention, there is provided a system performing compression and decompression of a video frame, comprising: a compression system, including: input control means for receiving and aligning data to be compressed; frequency transforming means for performing 1-dimensional and/or 2-dimensional frequency transformations of the data received from the input control; quantization and Rice mapping means for performing quantization and Rice mapping the transformed data outputted from the frequency transformation means; bit count combination means for calculating bit count for the quantized and Rice mapped data and for selecting one quantization value among the quantization values outputted from the quantization and Rice mapping means according to results of the bit count; encoding means for performing Golomb-Rice (GR) coding for the quantized and Rice mapped data and for packing the GR coded values, a DC value and the quantiztion value into a compression segment; and output control means for outputting the packed values, a decompression system, including: input control means for receiving data to be decompressed; decoding means for unpacking the data and for performing Golomb-Rice (GR) decoding for the unpacked data; inverse Rice mapping and inverse quantization means for performing inverse Rice mapping for the GR decoded data and performing inverse quantization for the inverse Rice mapped data; inverse frequency transforming means for performing inverse 1-dimensional and/or 2-dimensional frequency transformation for the inverse Rice mapped and the inverse quantized data; and decompression output control means for outputting the desired pixels from the finally decompressed pixels obtained by the inverse frequency transformation.

BRIEF DESCRIPTION OF THE DRAWINGS

The above and other objects and features of the present invention will become apparent from the following description of preferred embodiments taken in conjunction with the accompanying drawings, in which.

DESCRIPTION OF THE INVENTION

Hereinafter, a hardware system performing compression and decompression of video frame according to the present invention will be described in detail, referring to the accompanying drawings.

Figure 4:
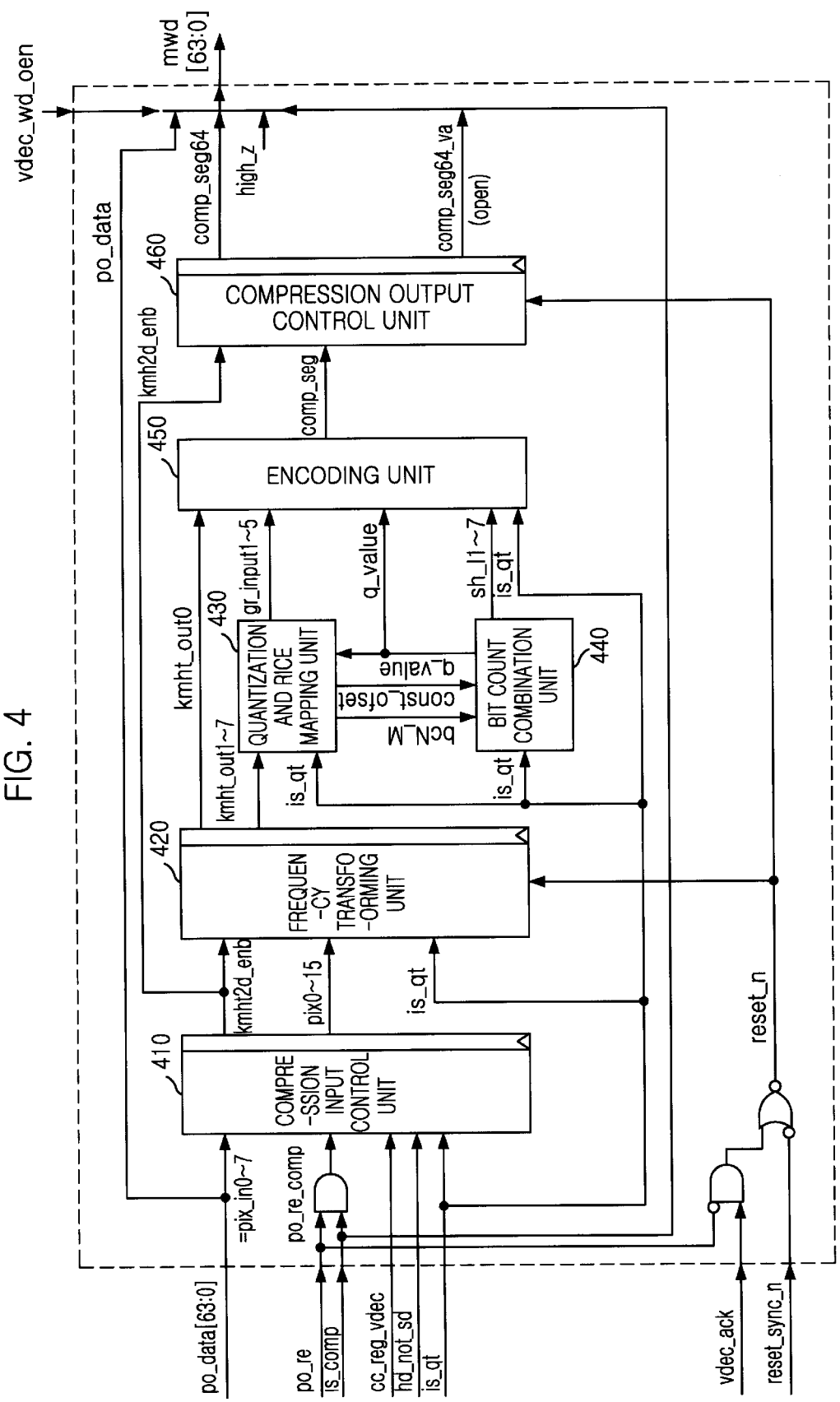
FIG. 4 is a block diagram illustrating a compression hardware in a video frame compression algorithm according to the present invention.

FIG. 4 is a block diagram illustrating a compression hardware implementing a video frame compression algorithm according to the present invention. A compression input control unit 410 receives data, which will be compressed, and aligns the received data. A frequency transforming unit 420 performs 1-dimensional and 2-dimensional frequency transformations for the aligned data, where the frequency transforming unit 420 is performed basically similar to a kind of modified Hadamard transform (KMHT), which has been already disclosed. A quantization and Rice mapping unit 430 and a bit count combination unit 440 performs quantization for the frequency transformed data and obtain a quantization value (q_value). An encoding unit 450 performs Golomb-Rice (GR) encoding, which is a kind of entropy coding, and packs the GR encoded values, a DC value and a q_value in a 32-bit compression segment. A compression output control unit 460 outputs the 32-bit packed values on a 64-bit basis.

The compression input control unit 410 receives 64-bit data (po_data[63:0]), rearranges them and outputs 64-bit or 128-bit data into the frequency transforming unit 420. Also, the compression input control unit 410 receives a control signal (is_comp) for determining whether the input data is to be compressed, a conformation signal (po_re) for confirming whether data is outputted from a VDEC, a first distinguish signal (cc_reg_vdec) for distinguishing whether the data outputted from the VDEC are chrominance components, a second distinguish signal (hd_not_sd) for determining whether a decoder is an HD mode or an SD mode and a compression ratio control signal (is_qt) for determining whether the compression is of 75% or 50%.

Figure 5:
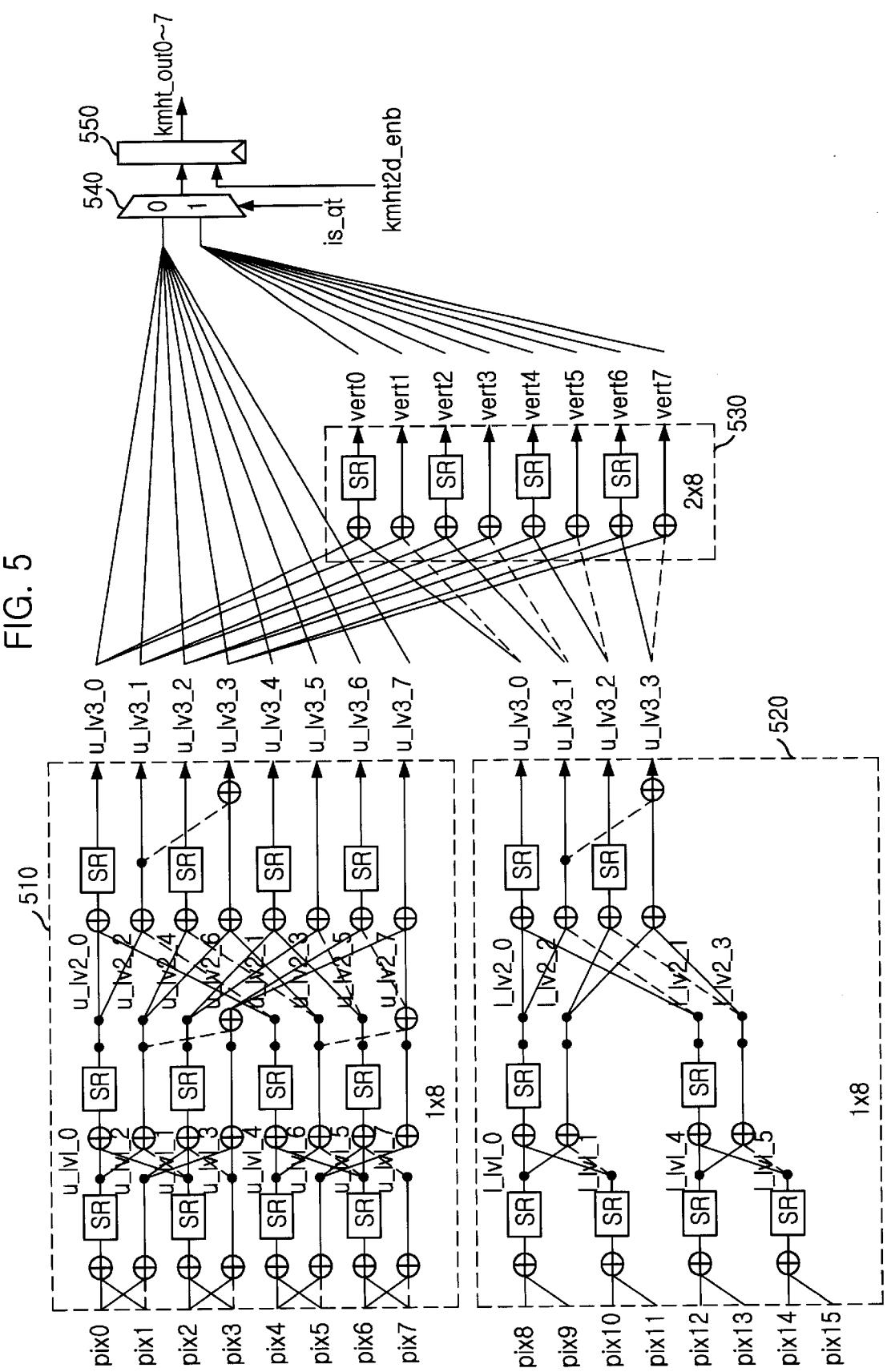
FIG. 5 a diagram illustrating a frequency transforming unit in the compression hardware according to the present invention.

FIG. 5 is a diagram illustrating the frequency transforming unit 420 of the compression hardware block diagram in FIG. 4. The frequency transforming unit 420 performs frequency transformation for a 1×8 or 2×8 pixel input. Hereinafter, an explanation of frequency transformation for the 2×8 pixel input will be described. In the present invention, the frequency transformation follows the KMHT.

The frequency transformation is firstly performed at an upper 1×8 transforming unit 510 and then another frequency transformation is performed at a lower 1×8 transforming unit 520. Results of the 2×8 transformation are finally obtained by adding and subtracting each of the 1×8 transformed results from units 510 and 520. A solid line represents addition and a dotted line represents subtraction. In FIG. 5, SRs carry out 1-bit right shift operations, that is, each of the SRs carry out an operation equal to dividing a value by two. Since the right shift is fixed, they are performed with wires in hardware.

The upper 1×8 transforming unit 510 is designed to totally obtain eight results. The lower 1×8 transforming unit 520 is designed to obtain four results only for low frequencies. Namely, in the case of 1×8 transformation only for performing 50% 1-dimensional compression, only the results from the upper 1×8 transforming unit 510 are outputted into a frequency transformation outputting unit 550 through a compression ratio selection unit 540. At this time, the compression ratio selection unit 540 is set to perform the 50% compression in response to the compression ratio control signal (is_qt).

On the other hand, in case of 2×8 transformation only for performing the 75% 2-dimensional compression, four resulting values from the upper 1×8 transforming unit 510 and four resulting values from the lower 1×8 transforming unit 520 are inputted in the 2×8 transforming unit 530 and they are added and subtracted each other and then the results are outputted to the frequency transformation outputting unit 550 via the compression ratio selection unit 540. At this time, the compression ratio of the compression ratio selection unit 540 is set to perform the 75% compression in response to the compression ratio control signal (is_qt).

Figure 1:
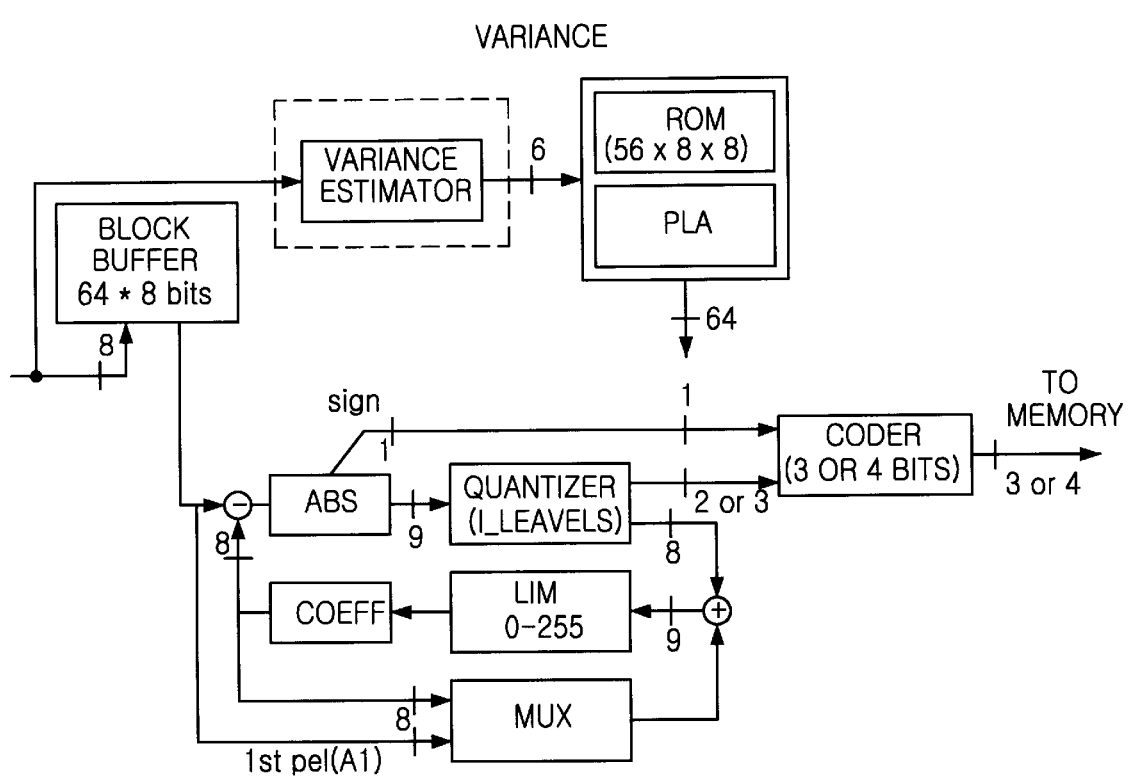
FIG. 1 is a block diagram illustrating the recompression and the ADPCM encoder.
Figure 2:
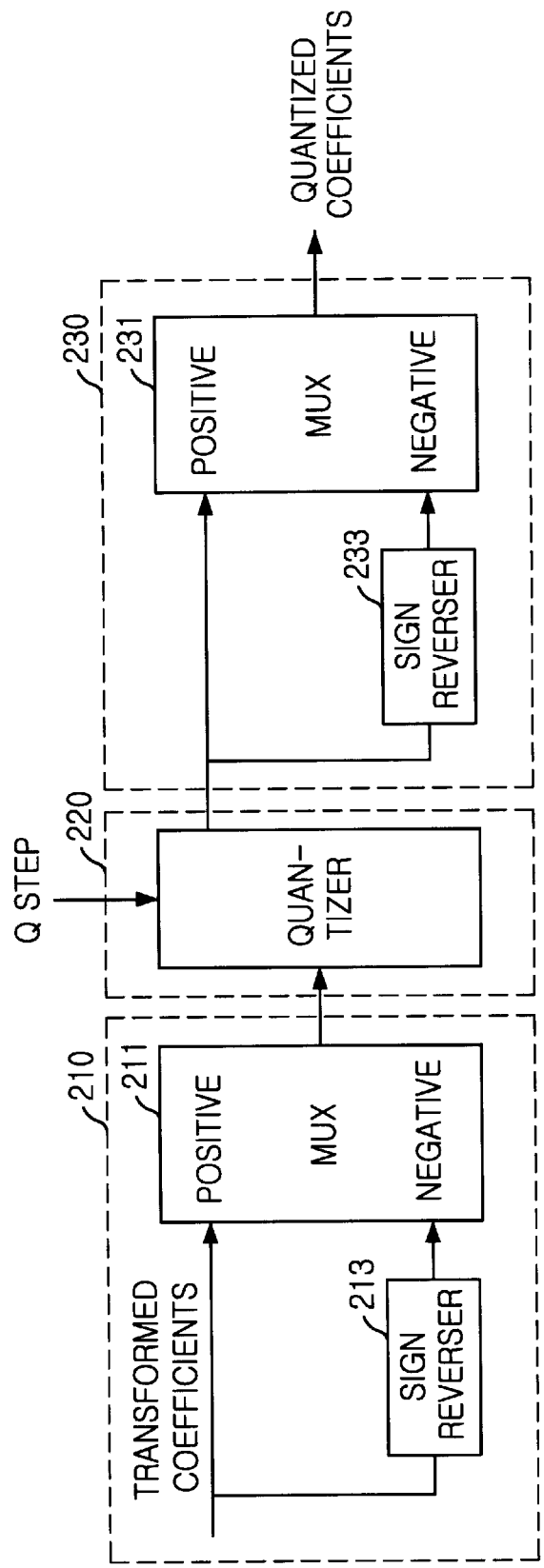
FIG. 2 is a block diagram illustrating a quantization unit in a video frame compression and decompression hardware.
Figure 3:
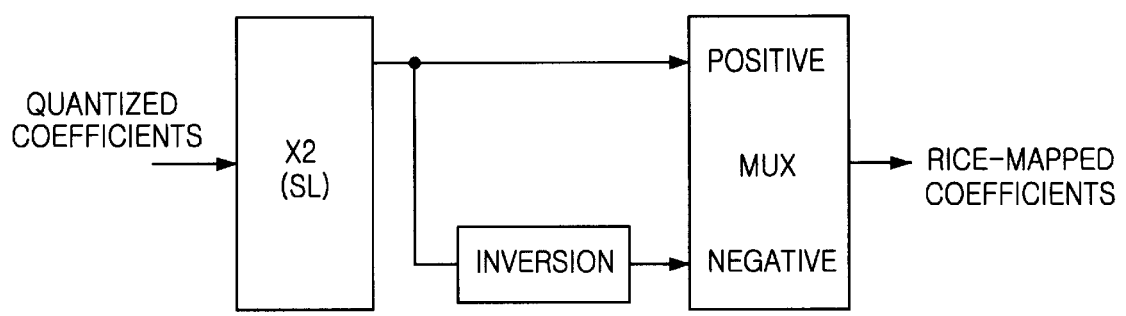
FIG. 3 a diagram illustrating a Rice mapping unit in the video frame compression and decompression hardware.

As shown in FIGS. 2 and 3, the hardware according to the prior art is generally performed by processing quantization values in parallel so that a plurality of wires and multiplexer are required. Accordingly, there are some disadvantages in that a relatively large space is required and the processing delay is increased. Accordingly, the present invention suggests a hardware configuration for implementing quantization and Rice mapping in an identical absolute value region.

Figure 6:
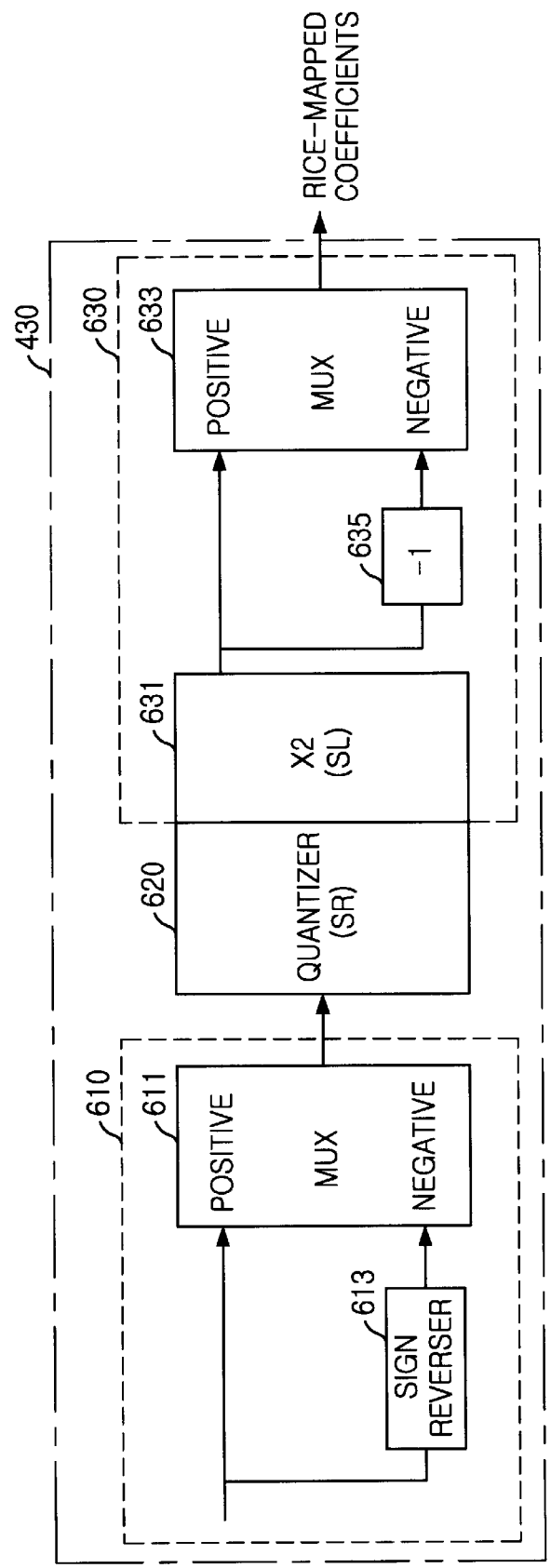
FIG. 6 is a block diagram illustrating the quantization and Rice mapping unit in the compression hardware according to the present invention.

FIG. 6 is a block diagram illustrating the quantization and Rice mapping unit 430 of the compression hardware block diagram according to the present invention.

In order to quantize seven AC coefficients (kmht_out_1 to kmht_out_7) outputted from the frequency transforming unit 420, the AC coefficients are quantized as it is when the AC coefficients are positive sign and, when the coefficients are negative sign, the negative sign is reversed by a sign reverser 613 within an absolute value converting unit 610, and then the sign-reversed coefficients are inputted into a multiplexer 611 within the absolute value converting unit 610. A quantizer 620 quantizes the outputs from the multiplexer 611 and a doubler (X2 (SL)) 631, which is in a Rice mapping unit 630, performs Rice mapping for the quantized absolute values as being left shifted by a circuit design.

Herein, the number of output coefficients of the frequency transformation unit 420 is eight and the number of input coefficients inputted into the quantization and Rice mapping unit 430 is seven so that the number of coefficients is mismatched. The reason is that the first coefficient, which is DC value, is not quantized because it has the most important information.

Figure 7:
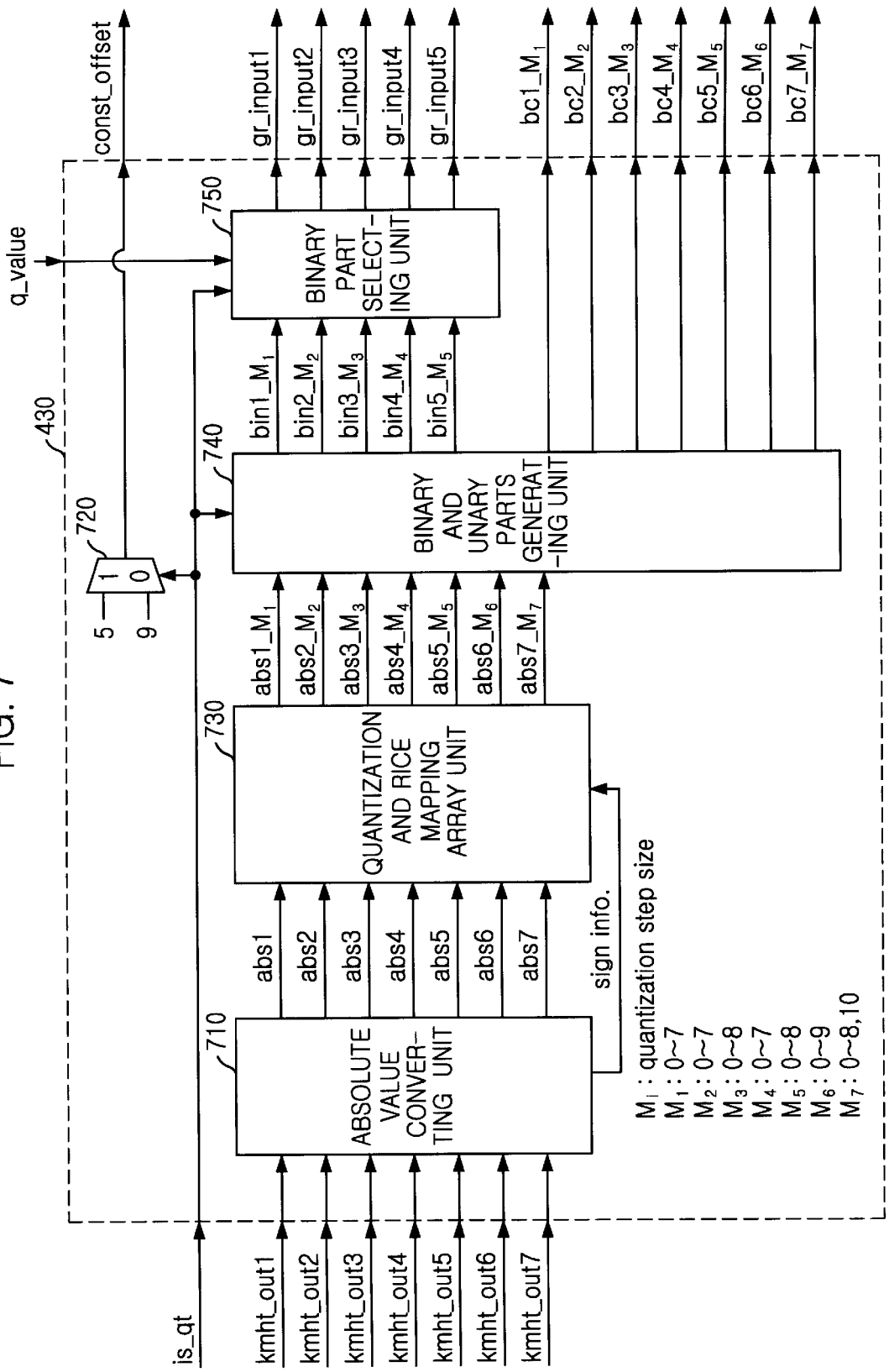
FIG. 7 is a block diagram in detail illustrating the quantization and Rice mapping unit in the compression hardware according to the present invention.

FIG. 7 is a block diagram illustrating the quantization and Rice mapping unit 430 of the compression hardware block diagram in FIG. 4. In order to rapidly perform quantization, the quantization is performed in parallel for all inputted coefficients and each coefficient has eight to ten numbers of quantization levels so that the 62 quantization values are computed in parallel.

An absolute value converting unit 710 in the quantization and Rice mapping unit 430 outputs the absolute magnitudes of the inputted coefficients, as defined in the absolute value coverting unit 610. Since sign information for seven coefficients capable of being obtained in these procedures are used in Rice mapping, the sign information of seven coefficients are inputted into a quantization and Rice mapping array unit 730. In the quantization, the quantization levels have been already determined according to the number of the quantization values, which are eight quantization values in the case of a 50% compression and sixteen quantization values in the case of a 75% compression. Since the results from the quantization are obtained in parallel, all of the possible results of quantization for the seven coefficients are the 62 quantization values.

The Rice mapping is applied for the obtained quantization coefficients. The Rice mapping performs 1-bit left shift and then additionally implements the subtraction of 1 from the obtained quantization values in the case of a negative sign. Accordingly, the right shift in quantization and the left shift in Rice mapping are performed at the same time. For example, if the right shift performs a 3 bits for the quantization and the shift left performs a 1 bit for the Rice mapping, a 2-bit right shift makes it possible to simultaneously perform the quantization and the Rice mapping.

When the quantization and the Rice mapping are performed at the same time, if the 62 results are negative sign, an additional operation is performed by a subtraction of 1 from the results having a negative sign and if the results are positive sign, the results are outputted as it is (abs1_$M_1$, . . . , absi_$M_i$ . . . , abs7_$M_7$), where, $M_i$ represents a quantization level for an $i^{th}$ coefficient. For example, since $M_7$ has 0 to 8 and 10 values, abs7_$M_7$ outputs the different 10 quantized and Rice mapped results at the same time.

After the quantization and Rice mapping are completed, a bit count is calculated in order to select the optimum quantization value (q_value) which will be inputted into 32-bit compression segment for data compression. The bit count is a sum of a fixed bit length (comma and binary part) and a various bit length (unary part) for each coefficient. Since the fixed bit length is already known, the fixed bit length is excluded in bit counting. The bit count for determining the quantization value is implemented by using only the unary part. Accordingly, the unary part (bc1_$M_1$, bc2_$M_2$, . . . , bc7_$M_7$) is only inputted into a bit count combination unit 440.

A constant offset value (const_offset) is a constant value for simplicity of determining whether the calculated bit count is over for a 32-bit segment. In the case of 50% compression, the number '9' is outputted and in the case of 70% compression, the number '5' is outputted. The reason will be described referring to FIG. 9.

The bit count combination unit 440 determines the quantization value (q_value) and a binary selecting unit 750 outputs the selected binary part necessary for the Golomb-Rice coding to the Golomb-Rice coding input values (gr_input1~gr_input5) by using the determined quantization value (q_value). At this time, $6^{th}$ and $7^{th}$ coefficients do not have the binary part so that it is not necessary to output them.

Figure 8:
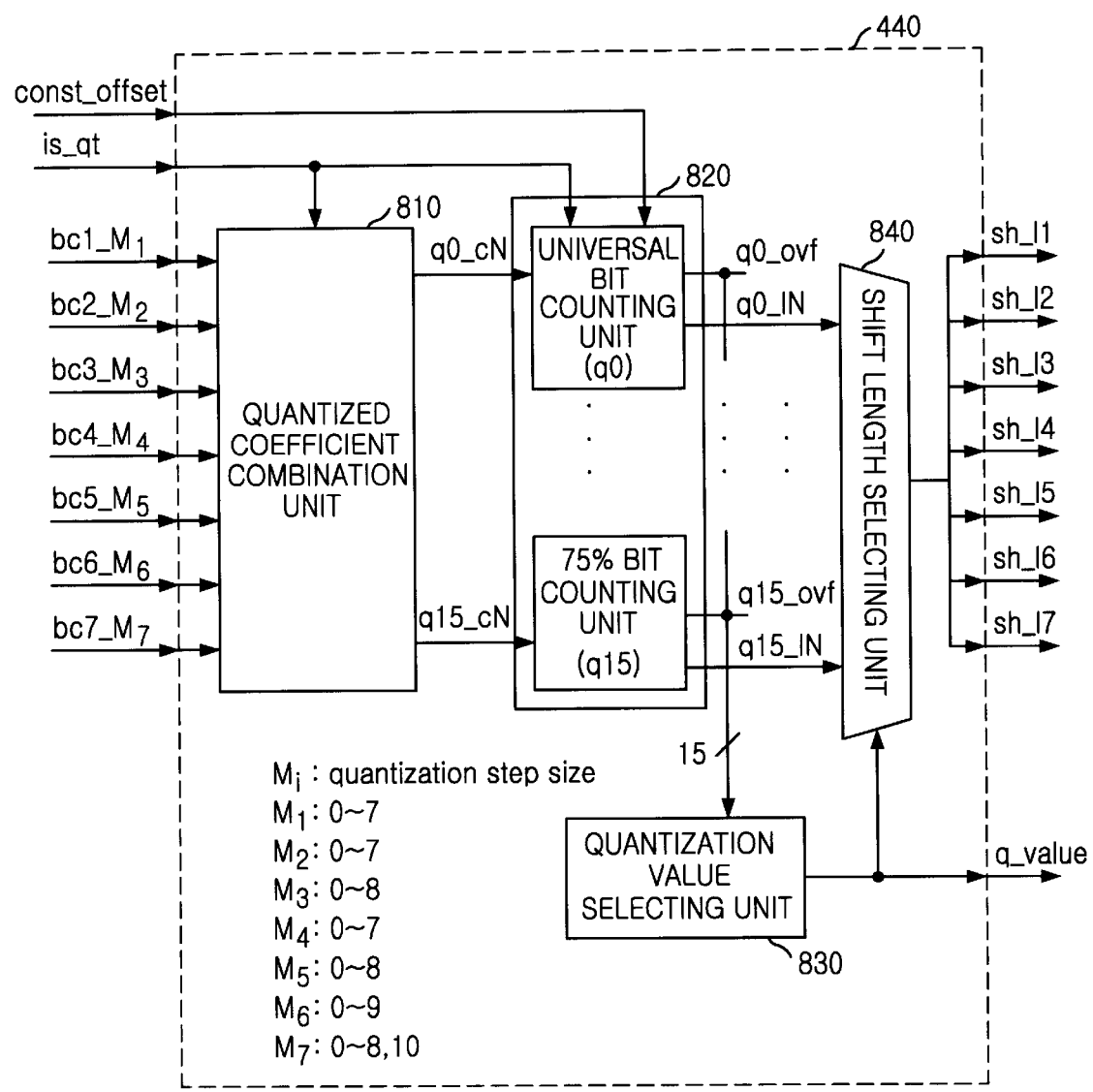
FIG. 8 is a diagram illustrating the bit count combination unit in the compression hardware according to the present invention.

FIG. 8 is a diagram illustrating the bit count combination unit 440 of the compression hardware block in FIG. 4.

The bit count combination unit 440 receives the 62 quantization unary values and calculates bit counts by making combinations according to the quantization values (8 quantization values in 50% compression or 16 quantization values in 75% compression). The bit count combination unit 440 selects the final quantization value (q_value) according to the results of the bit count. Also, when the bit count is calculated, shifting lengths (sh_l1~sh_l7) for each code are calculated and outputted for the next code packing.

Namely, the 62 Rice mapped unary parts are packed in a set of seven values, respectively, according to quantization values from q0 to q15 by a quantized coefficient combination unit 810 and inputted into a universal bit counting units, which are represented as q0_cN to q7_cN, corresponding to the 50% and 75% compressions and a 75% bit counting units, which are represented as q8_cN to q15_cN only corresponding to the 75% compression. For example, when the quantization value is 15 in 75% compression, quantization levels for each coefficient are 7, 7, 8, 7, 8, 9 and 10 respectively so that bc1_7, bc2_7, bc3_8, bc3_8, bc4_7, bc5_8, bc6_9 and bc7_10, which are represented as q15_cN in FIG. 8, are inputted into the 75% bit counting unit. Namely, bc1_7, bc2_7, etc. are corresponded to q15_c1, q15_c2, etc., respectively. On the other hand, in the case of a 50% compression, q0_cN~q7_cN are only inputted.

The bit count combination unit 440 calculates the amount of the bits generated by the quantization values. In order to calculate the generated amount of the bits, the following are firstly considered. The universal bit counting units (q0_cN~q7_cN) calculate the bit count for all of the 50% and 75% compressions for q0_cN to q7_cN. The 75% bit counting units (q8_cN~q15_cN) calculate bit count for q8_cN~q15_cN only for the 75% compression. The quantization value (q_value) are determined in a quantization value selecting unit 830 according to the calculated result of amount of the generated bits, which is presented with overflow bits (q0_ovf~q15_ovf). The bit counting unit 820 implements bit count for the accumulated shift length (q0_lN~q15_lN) necessary for representing the unary in Golomb-Rice coding, (by considering the unary part except the overflowed bits) and sends the results to a shift length selecting unit 840.

The values of the accumulated length are outputted for all quantization values. These values are selected by the quantization value (q_value) in the bit count combination unit 440 and finally outputted as signals from sh_l1 to sh_l7 in the shift length selecting unit 840. The amount of the generated bits from the Golomb-Rice (GR) coding is given by:

$$\text{Amount of bits from coefficient "}c\text{"}=k+1+(c>>2^k)- \quad (1)$$

where, k, which is a variable defined by the GR code, represents the bit size of binary part of the generated GR code and '1' represents a comma code. '$C>>2^k$' is a unary obtained by removing the lower k-bit binary part in coefficient "c" and is represented with the unary part.

For example, if k is 2 and a coefficient '10011' is GR coded, the lower two bits, '11', are coded with binary because of k=2 and a part except the lower two bits, '100', means decimal number '4'. The number '4' represents '0000' in unary number. Accordingly, the final GR coded coefficient including a comma becomes '0000111'. The generated bits are seven bits. Also, in formula 1, the resulting bits is $2+1+(19>>2^2)=2+1+4=7$ so that they are equal to each other.

Basically, since the k is adaptively calculated by generation probability of a symbol, the GR coding can be a kind of adaptive entropy coding. However, the k is calculated for each coefficient position through a simulation for image data and fixed in performing the hardware according to the present invention.

Figure 9:
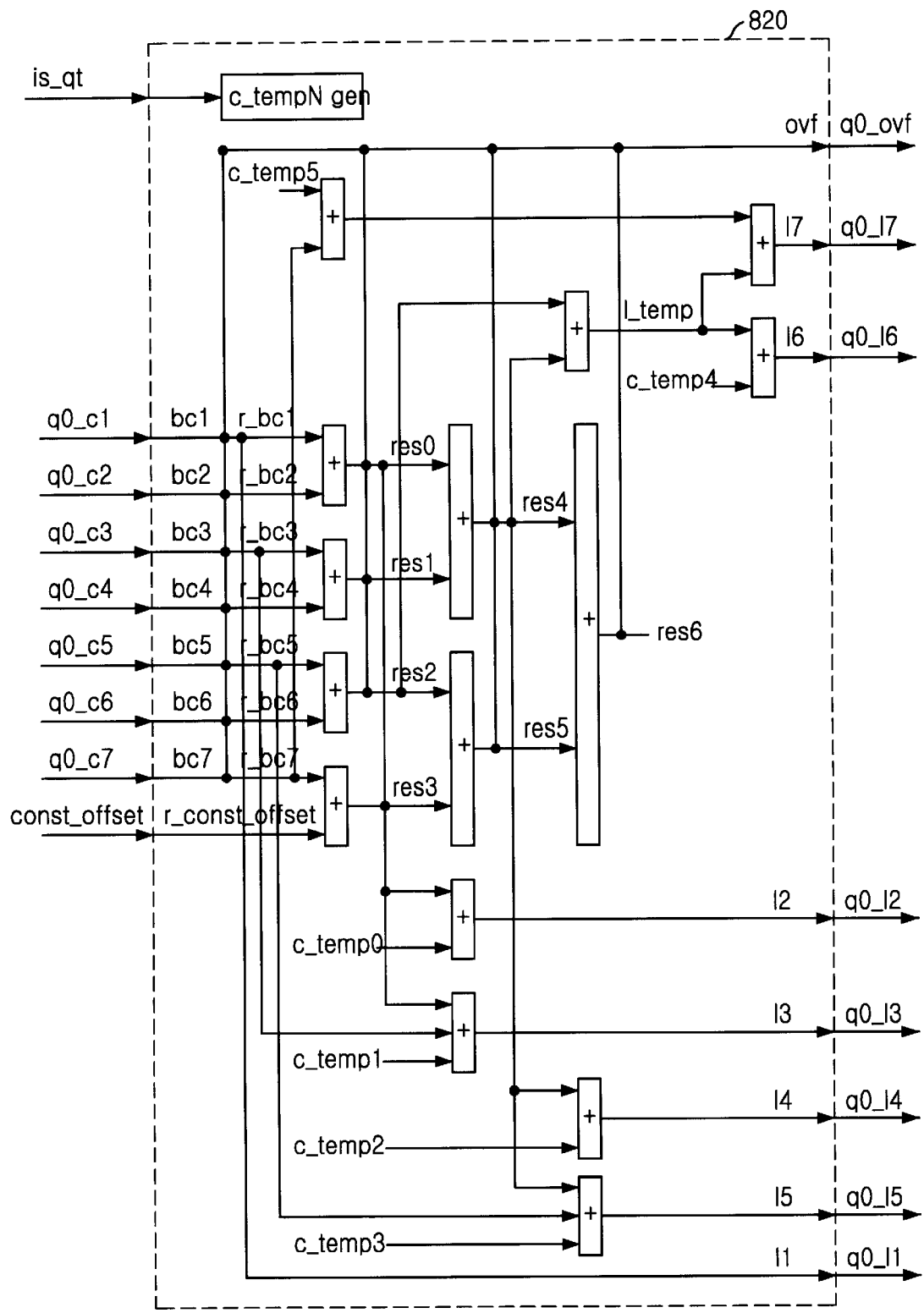
FIG. 9 is a diagram illustrating the universal bit counting unit in the bit count combination unit according to the present invention.

FIG. 9 is a diagram illustrating the universal bit counting unit 820.

The 50% compression for 32 bits uses three bits (because the number of quantization values is eight, three bits are required) as the quantization value and eight bits as the DC coefficient so that seven GR codes (AC coefficients) are filled in the remaining 21 bits. Meanwhile, the 75% compression, for 32 bits, uses 4 bits (4 bits is required due to 16 quantization values) as the quantization value (q_value) and 8 bits as the DC coefficient so that the GR codes (AC coefficients) are filled in the remaining 20 bits.

Accordingly, in the case of the 50% compression, the sum of length of the GR codes has to be less or equal to 21 bits and, in the case of the 75% compression, the sum of length of GR codes has to be less than or equal to 20 bits. There is a problem in that a complex subtracter is required for comparing 21 bits or 20 bits in hardware. The present invention briefly performs the comparison in hardware by using the following way.

The Golomb-Rice code consists of the variable k, comma '1' and the rest is the unary part. Since the variable k has been already fixed by the simulation in the present invention, the sum of the seven Golomb-Rice codes except the unary part has been already determined. Namely, the sum is fifteen in the case of a 50% compression and the sum is ten in case of 75%.

Eventually, the comparison formulas of each compression is as follows:

In the case of the 50% compression, formula 2 is as follows:

$$15+(\text{the sum of lengths of the unary parts of 7 GR codes})> \quad (2)$$

In the case of the 75% compression, formula 3 is as follows:

$$10+(\text{the sum of lengths of the unary parts of 7 GR codes})> \quad (3)$$

In formulas 2 and 3, for example, a number '6' is subtracted at both sides of the formula 2 and a number '5' is subtracted at both sides of the formula 3 so that the comparable values '21' and '20' become 15. The calculated formulas are as follows:

In the case of the 50% compression, wherein:

$$9+(\text{the sum of length of the unary part of 7 GR codes})>15 \quad (4)$$

In the case of the 75% compression, wherein:

$$5+(\text{the sum of length of the unary part of 7 GR codes})>15 \quad (5)$$

Namely, the number '9' is inputted as the bit count constant (const_offset) in case of a 50% compression and the number '5' is inputted as the bit count constant (const_offset) in case of a 75% compression so that the sum of the bit lengths of the seven GR codes, which is larger than 15, is always detected. That is, the detection is implemented when the sum of the bit lengths of the seven GR codes is larger than or equal to sixteen.

In the hardware, a determination whether the sum of the bit lengths of the seven GR codes is larger than or equal to sixteen is performed by detecting whether any value over '1' exist in the upper bits except the lower 4 bits, which is from $1^{st}$ to $4^{th}$ bits, in the result of the sum of the bit count. Accordingly, the results of the bit count addition have the results from actual calculation of the lower four bits and the results from bitwise-ORing the rest of the upper bits.

In conclusion, a 4-bit adder is enough to perform an internal calculation of the bit counting unit and the rest of the upper bits exist as overflowed bits through the bitwise OR.

For example, the bit count will be described for a 50% compression.

Firstly, the universal bit counting unit 820 with the individual units adds, in parallel, the unary part (q0_cN~q7_cN) with the inputted constant (const_offset). The inputted data (bc1~bc7, const_offset) and results (res0, res1, res2, res3, res4, res5, res6, res7) have 4-bit data width and each upper bit except the lower 4 bits of the data (bc1~bc7, const_offset) and )res0, res1, res3, res4, res5, res6, res7) is bitwise OR'ed and the bitwise OR'ed results are logically summed and then the finally overflowed bits are obtained. Namely, if the overflowed bits are over '1', it means that the bit count is higher than or equal to seven so that the current quantized values are overflowed for the 32-bit segment.

The bit counting unit 820 also calculates the quantity of accumulated shifts necessary for packing the GR codes. The quantity of the accumulated shift of the current coefficient is calculated with the sum of the total lengths of the previous GR codes and the sum of the length of the unary parts of the current coefficient. In order to reduce hardware resource, the interim resulting values used in the bit counting unit 820 and the interim resulting values for calculating quantity of the accumulated shifts are shared (res0, res2, res4) and a parallel adding way is used. The quantity of the accumulated shifts is calculated by summing the length of GR coes of a previous coefficient and the length of a unary part of a current coefficient.

Figure 10:
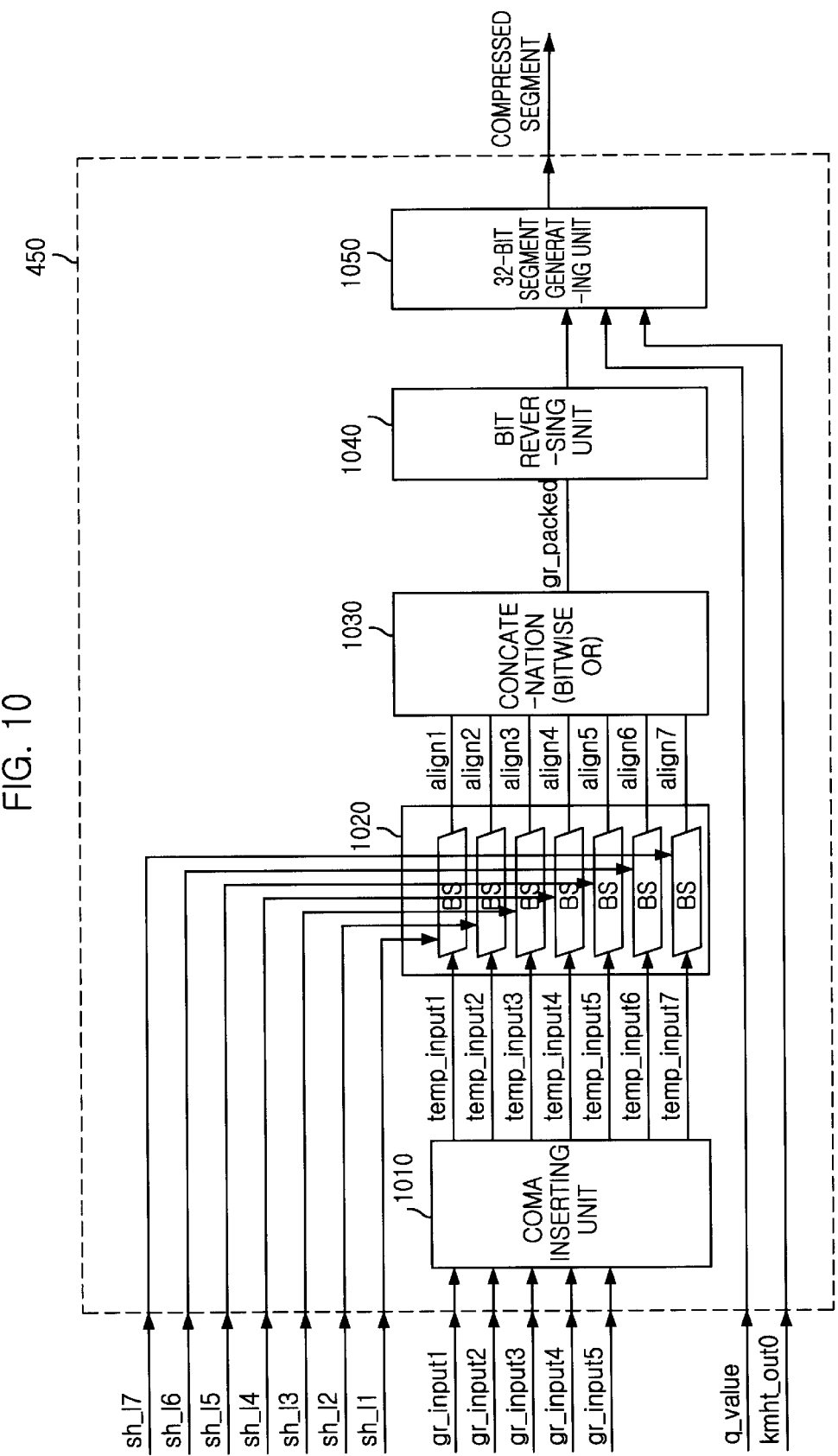
FIG. 10 is a diagram illustrating the encoding unit according to the present invention.

FIG. 10 is a diagram illustrating the encoding unit 450 according to the present invention. Functions for the GR coding and packing of the quantized data are performed.

Referring to FIG. 10, when the binary part, gr_input1 to gr_input5, are inputted in a comma inserting unit 1010, the comma is inserted and then the resulting values are inputted in a barrel shifting unit 1020. As the results are right shifted by the length (sh_11~sh_17), the aligned results (align1~align7) are obtained to be packed. The GR codes, which are AC values, are packed by implementing bitwise OR in a bitwise OR unit 1030 for 7 results (align1~align7). In order to easily perform the above procedure in the hardware, the results are bit-reversed in a bit reversing unit 1040 and then a 32-bit compression segment is finally obtained in a 32-bit segment generating unit 1050 by using the quantization value (q_value) and the DC value (kmht_out0).

Since there is no binary part in $6^{th}$ and $7^{th}$ coefficients, only commas are inserted in the comma inserting unit 1010 without any inputs. When the packed AC value, the quantization value (q_value) and the DC value (kmht_out0) are packed into 32-bit segment, the bit reverse is needed for reducing multiplexer circuit. The reason for the bit reversal is that bits of valid quantization values (q_value) are changed according to the compression mode.

When implementing the right shift, '0' is inputted. The '0' represents a unary part of a current coefficient and, also, makes each code naturally connected when implementing the bitwise OR. Shifting length for each coefficient has a limitation for the minimum shifting value and the maximum shifting value according to an existence of the k value and the comma bit. Accordingly, the barrel shifter (BS) 1020 in FIG. 10 has a simple structure different from a general barrel shifter.

Figure 11:
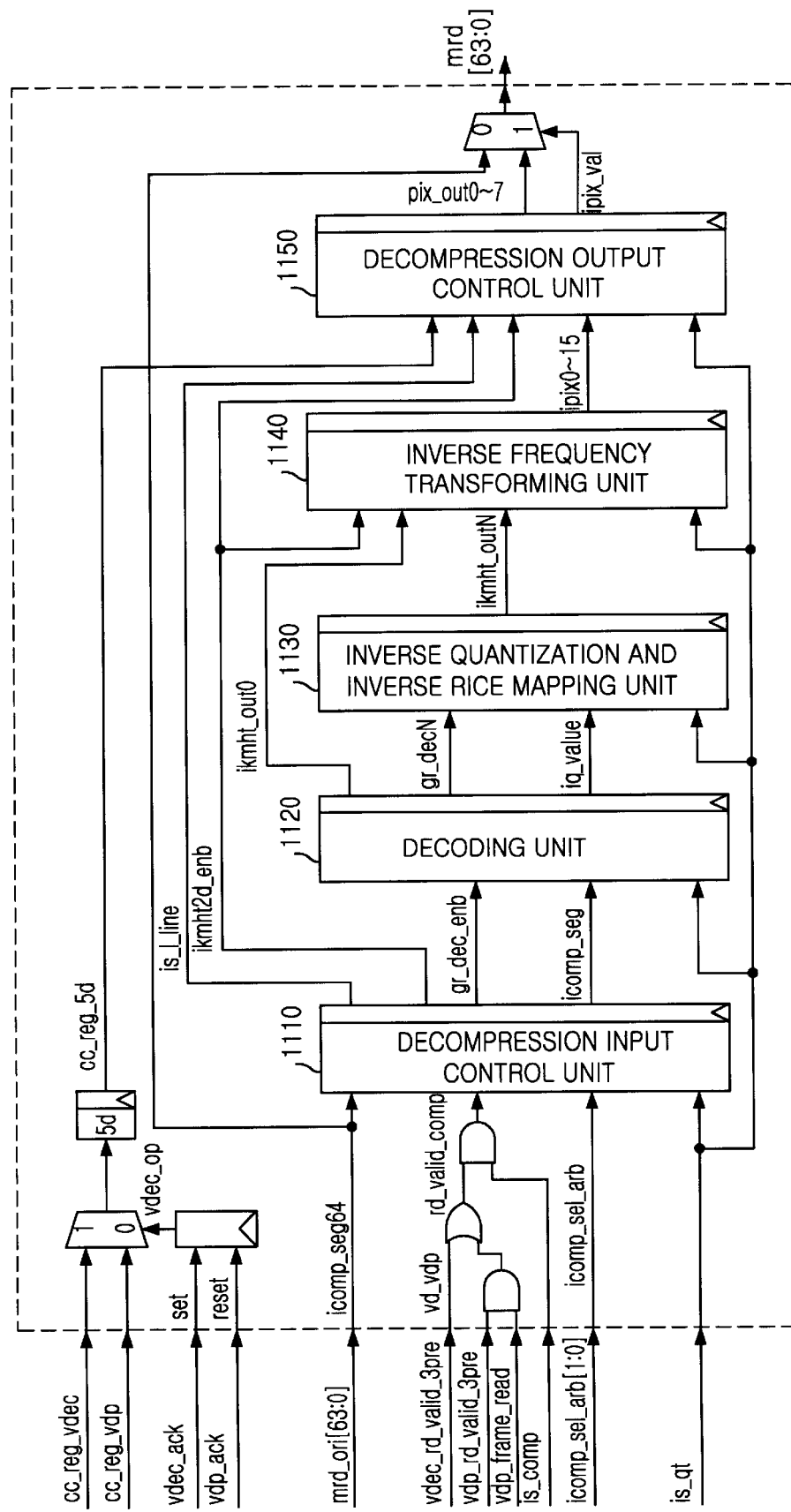
FIG. 11 is a block diagram illustrating a decompression hardware in a video frame decompression algorithm according to the present invention.

FIG. 11 is a block diagram illustrating decompression hardware in a video frame decompression algorithm according to the present invention. The decompression algorithm, which is performed by the inverse processing of the compression algorithm, is performed in order of a Golomb-Rice (GR) decoding, inverse Rice mapping, inverse quantization and inverse frequency transformation. Now, operation for each element in the decompression hardware will be described.

A decompression input control unit 1110 receives data, which will be decompressed, and transmits the data to a decoding unit 1120. The decoding unit 1120 unpacks the data and performs the GR decoding. The inverse quantization and inverse Rice mapping unit 1130 performs inverse quantization and inverse Rice mapping for the GR coded data. An inverse frequency transforming unit 1140 obtains final decompressed pixels (ipix0~15). Finally, a decompression output control unit 1150 selects the desired pixels and outputs them. Configuration of the decompression input control unit 1110 and the decompression output control unit 1150 can be modified according to interface circumstance so that, herein, the blocks will be not described.

At this time, a signal, 'cc_reg_vdp', is employed to read data from the current VDEC memory for chrominance and a signal, 'cc_reg_vdec', is employed to read data from the current VDP for chrominance. Signals, 'vdeck_ack and a vdp_ack', are memory request signals of VDEC and VDP respectively. A signal, 'mrd_ori[63:0]', is employed to read memory data from SDRAM. Signals, 'vdec_rd_valid_3pre' and 'vdp_rd_valid_3pre', are signals notifying whether data are inputted from the memory and a signal, 'vdp_frame_read', represents that the current data are for VDP frame read. A signal, 'is_comp', is employed to determine a compression mode or a normal mode and a signal, 'icomp_comp_arb[1:0]', is a segment and pixel selection signal from the arbiter made from the discard address bits during address translation. A signal, 'is_qt', is a compression ratio control signal to determine whether the compression is of 50% or 75%.

Figure 12:
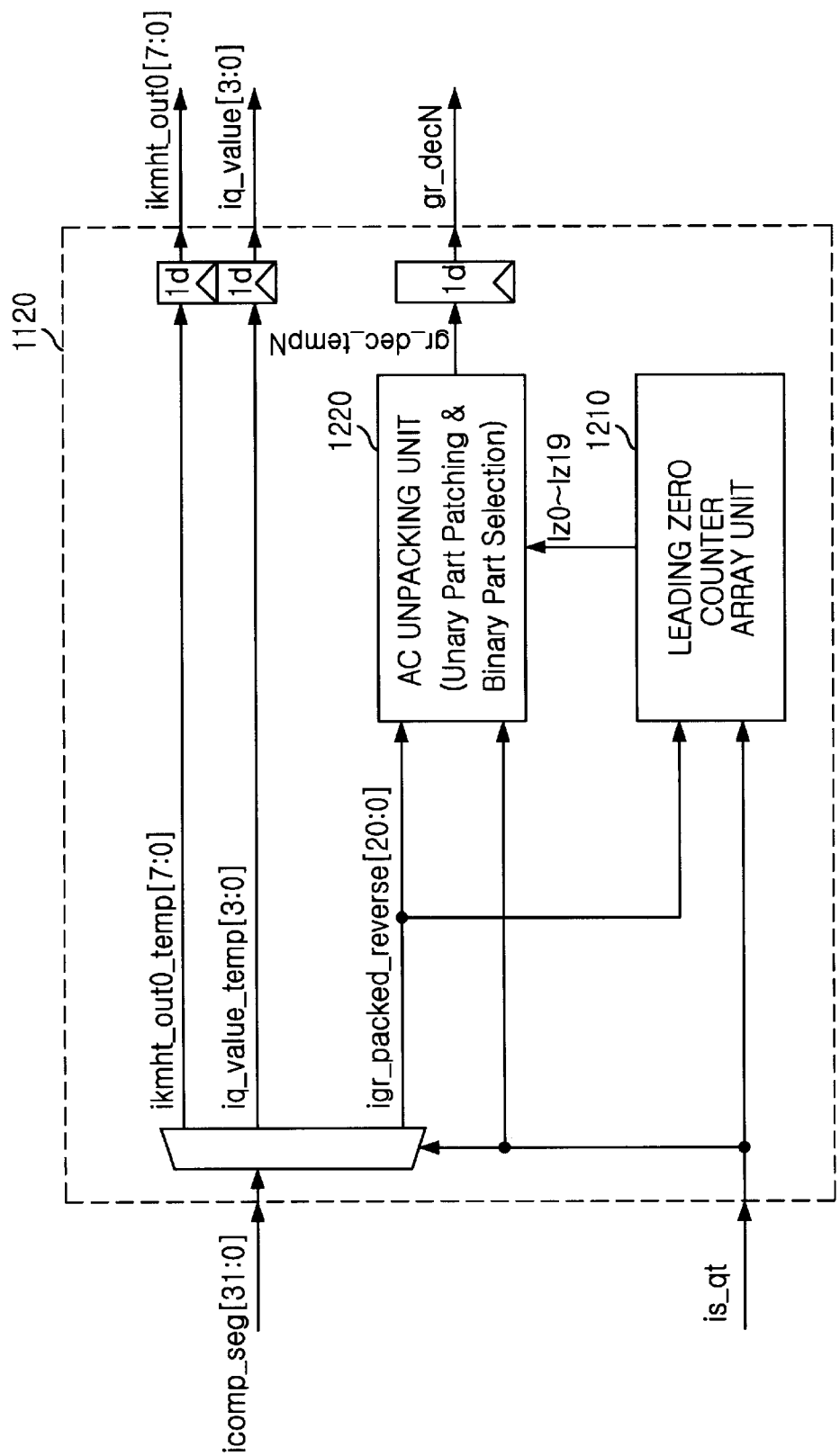
FIG. 12 is a block diagram illustrating the decoding unit in the decompression hardware according to the present invention.

FIG. 12 is a block diagram illustrating the decoding unit 1120 in the decompression hardware blocks in FIG. 11 according to the present invention.

The decoding unit 1120 selects a DC value (ikmht_out0_temp) and quantization values (q_value_temp) from the compressed segment (icomp_seg[31:0]) and decodes AC coefficients (gr_dec_tempN), which are GR-decoded from the rest of the packed bits, which are 21 bits in the case of the 50% compression and 20 bits in the case of the 75% compression. The decoded results are transmitted into the inverse quantization and inverse Rice mapping unit 1130 by being stored in flip-flop (ikmht_out0, iq_value, gr_decN).

The GR codes are separated from the compressed segment and then unpacked. The unpacked GR codes are decoded. The lengths of the GR codes are variable so that the lengths for each GR code cannot be known. Therefore, in order to decode the seven GR codes, seven dependent steps are required so that, if this algorithm is applied to the hardware, the minimum seven cycles, which are processing delay cycles, are required. However, the present invention separates, in parallel, the seven GR codes by using a leading zero counter so that the decoding of the seven GR codes is implemented in one cycle.

Namely, the length of a bitstring of successive '0' is distinguished by a leading zero counter so that the unary part of the GR codes is calculated for all cases in advance and then the GR codes are decoded when a multiplexer is selected. Since the unpacking and GR decoding take a long delay time in hardware configuration, the unpacked and GR decoded data are stored in a register (ikmht_out0, iq_value, gr_decN) and then transmitted into the next block.

A leading zero counter array unit 1210 detects the bitstring of the successive '0', which starts in each packed bitstring so that the binary values for the unary part are calculated and starting positions of the AC coefficients can be known.

Figure 13:
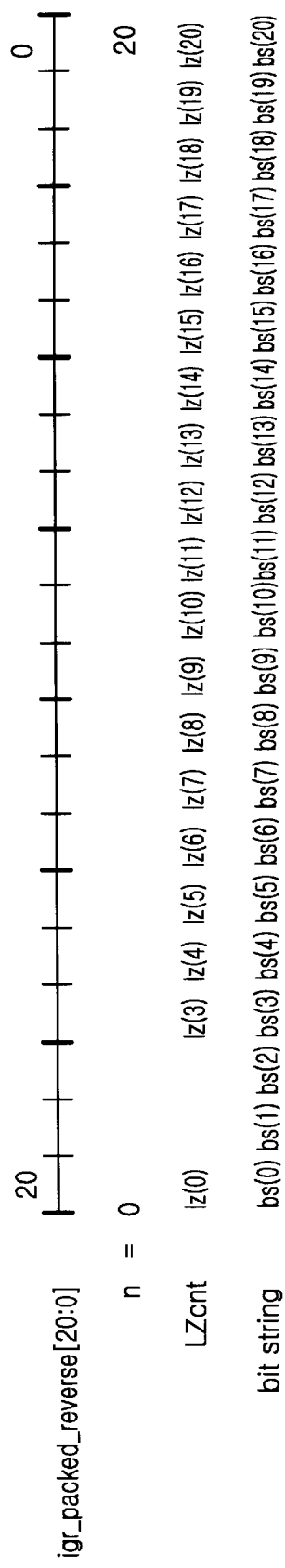
FIG. 13 is a diagram for explaining the Golomb-Rice (GR) decoding according to the present invention.

FIG. 13 is a diagram for defining the signals necessary for the GR decoding according to the present invention.

A lz(n) is a bitstring length, in which '0' bits continue to the right from the $n^{th}$ bit of a packed bitstring (igr_packed_reverse[20:0]) and bs(n) represents a bitstring starting from the $n^{th}$ bit. The leftmost bit is labeled as $0^{th}$ and the number of the bit is increased to the right one by one. The reason why the leading zero count is performed for all positions is that a starting point of the GR codes cannot be known.

Figure 14:
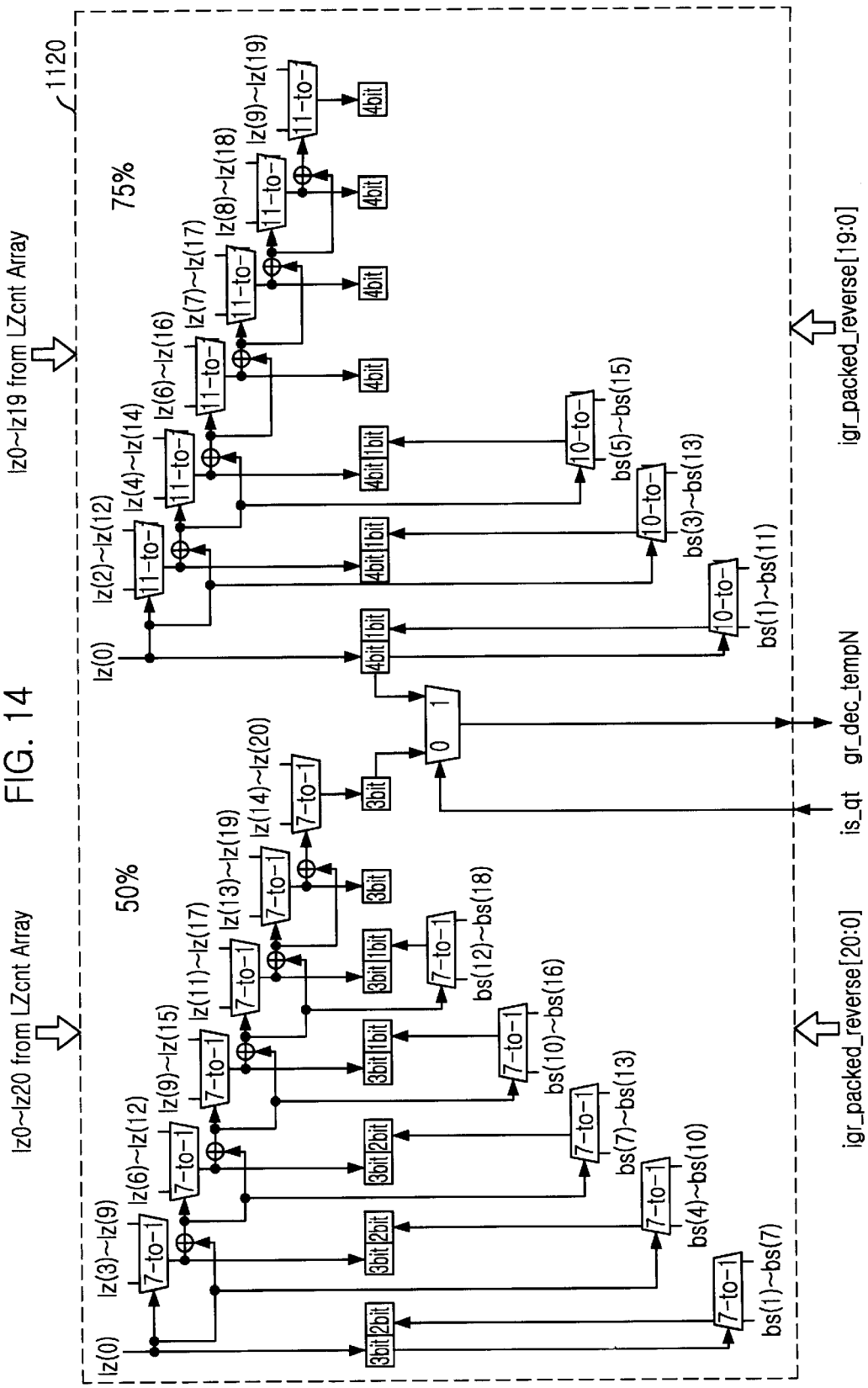
FIG. 14 is a diagram illustrating an AC unpacking unit in the decoding unit according to the present invention.

FIG. 14 is a diagram illustrating an AC unpacking unit 1220 in the decoding unit 1120.

The unary part and the binary part of the GR codes are decoded by using the results of the leading zero counter array unit 1210. Namely, after knowing the length of lz(0), which is the unary part of the first GR code, the starting position of the second GR code can be known by considering the comma bit and the binary part.

For example, in the 50% decompression, the unary part of the second GR code is obtained by selecting one of the values from lz(3) to lz(9) according to the lz(0) value and the third GR code is selected in values from lz(6) to lz(12) by adding lz(0) value to the selected lz value from the second code. In the same way as mentioned the above, decoding for the unary part of the 7 AC coefficients is performed.

The unary part of the decoded AC coefficients is joined with the binary part. Since the binary part of the GR codes does not need any changes, it is enough to select the binary part from the bitstring. That is, the binary part of the first GR code is selected in values from bs(1) to bs(7) except the comma bit according to the lz(0) of the unary part. The GR decoding requires two circuits because selecting regions of a multiplexer is different from each other according to compression modes such as the 50% and 75% compressions. However, shared hardware may be used by a proper coding.

Figure 15:
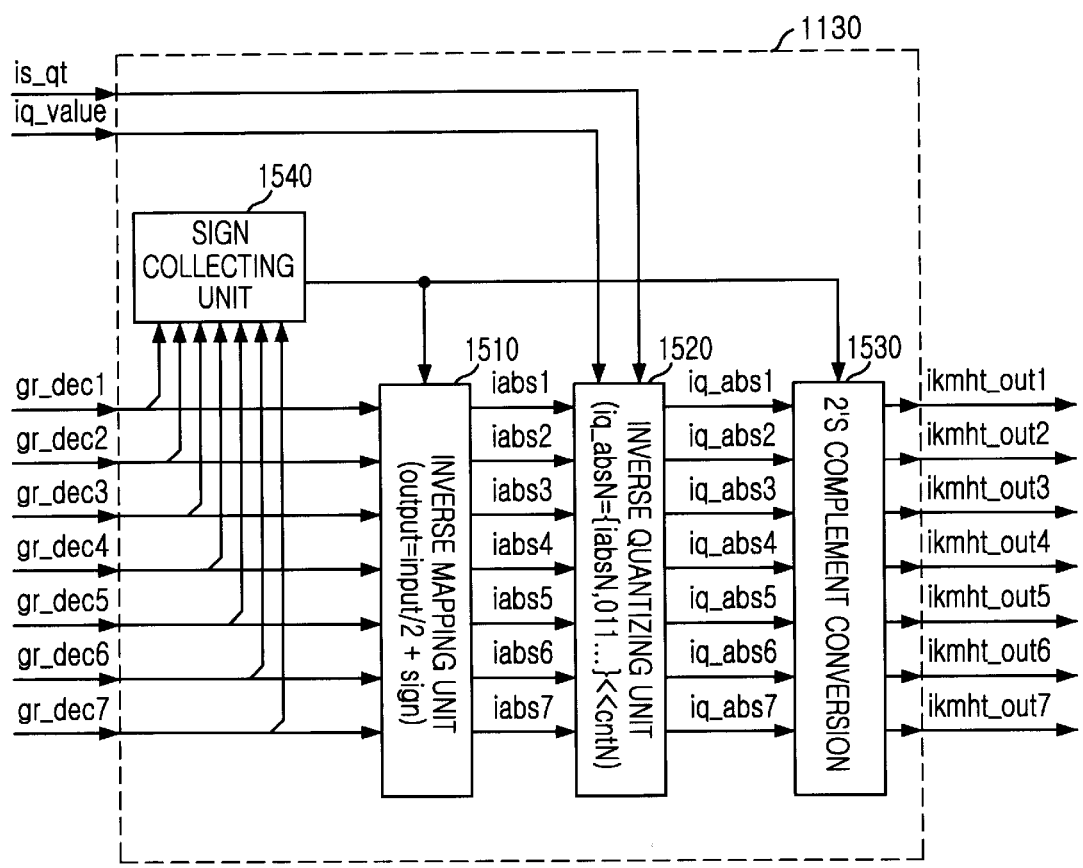
FIG. 15 is a diagram illustrating an inverse quantization and inverse Rice mapping unit according to the present invention.

FIG. 15 is a diagram illustrating the inverse quantization and inverse Rice mapping unit 1130 in FIG. 11 according to the present invention. The inverse quantization and the inverse Rice mapping are performed for the GR decoded AC coefficients.

The inverse Rice mapping is to obtain original positive or negative AC coefficients. If the inverse Rice mapping and the inverse quantization are performed respectively, the converted original positive or negative AC coefficients have to be converted into positive AC coefficients when the AC coefficients are inverse quantized. Herein, in order to omit the sign reversing procedure, the following method is employed. Namely, the Inverse Rice mapping obtains only absolute values (iabsN) of the AC coefficients and then the inverse quantization is performed for the results. Finally, the inverse quantization results are converted into negative and positive values respectively.

In Rice mapping, when the AC coefficient is negative sign, '1' is subtracted in the AC coefficient after making double value for the absolute value of the negative AC coefficient. Therefore, in the decoding state, in order to calculate the absolute value, the GR decoded AC coefficients (gr_decN) are divided by two and then '1' is added in the case of a negative sign. On the other hand, the GR decoded AC coefficients (gr_decN) are just divided by 2 in the case of a positive sign. The least significant bit (LSB) determines whether the GR decoded AC coefficients (gr_decN) are a positive sign or a negative sign. Namely, when the LSB is '1', the AC coefficient is a negative sign and when the LSB is '0', the AC coefficient is a positive sign.

An inverse quantizing unit 1520 performs the inverse quantization for the outputted values (iabsN) from the inverse Rice mapping unit 1510. Quantity to be left shifted is calculated for each AC coefficient according to the compression mode (is_qt) and the inverse quantization value (iq_value). When the quantity to be left shifted is determined, the AC coefficients are left shifted as much as the power of '2'. At this time, bit inputted to the right is the type of 01111 . . . , where the first bit is '0' and the rest of the bits are '1'. In other words, the inputted value to the lower bits is near to half the maximum representable value by the bitwidth of the inputted bits. This minimizes quantization error in inverse quantization. The inputted value is called a centeroid because it is near the half value for the bit width.

When the inverse quantized values (iq_absN) are outputted from the inverse quantizing unit 1520, a 2's complement converting unit 1530 performs 2's complement conversion by using the sign information in order to convert the inverse quantization values (iq_absN) into original sign values. The 2's complement converted values are inputted in an inverse frequency transforming unit 1140 and then frequency transformation is performed. Signs of a sign collecting unit 1540 consist of LSBs of signals (gr_decN) outputted from the decoding unit 1120.

Eventually, the inverse quantization and inverse Rice mapping unit 1130 join 0111 . . . at right of the inverse Rice mapping values (iabsN) and performs left shift by calculating quantity of inverse quantization shift (cntN) so that the inverse quantization absolute values (iq_absN) are calculated.

Figure 16:
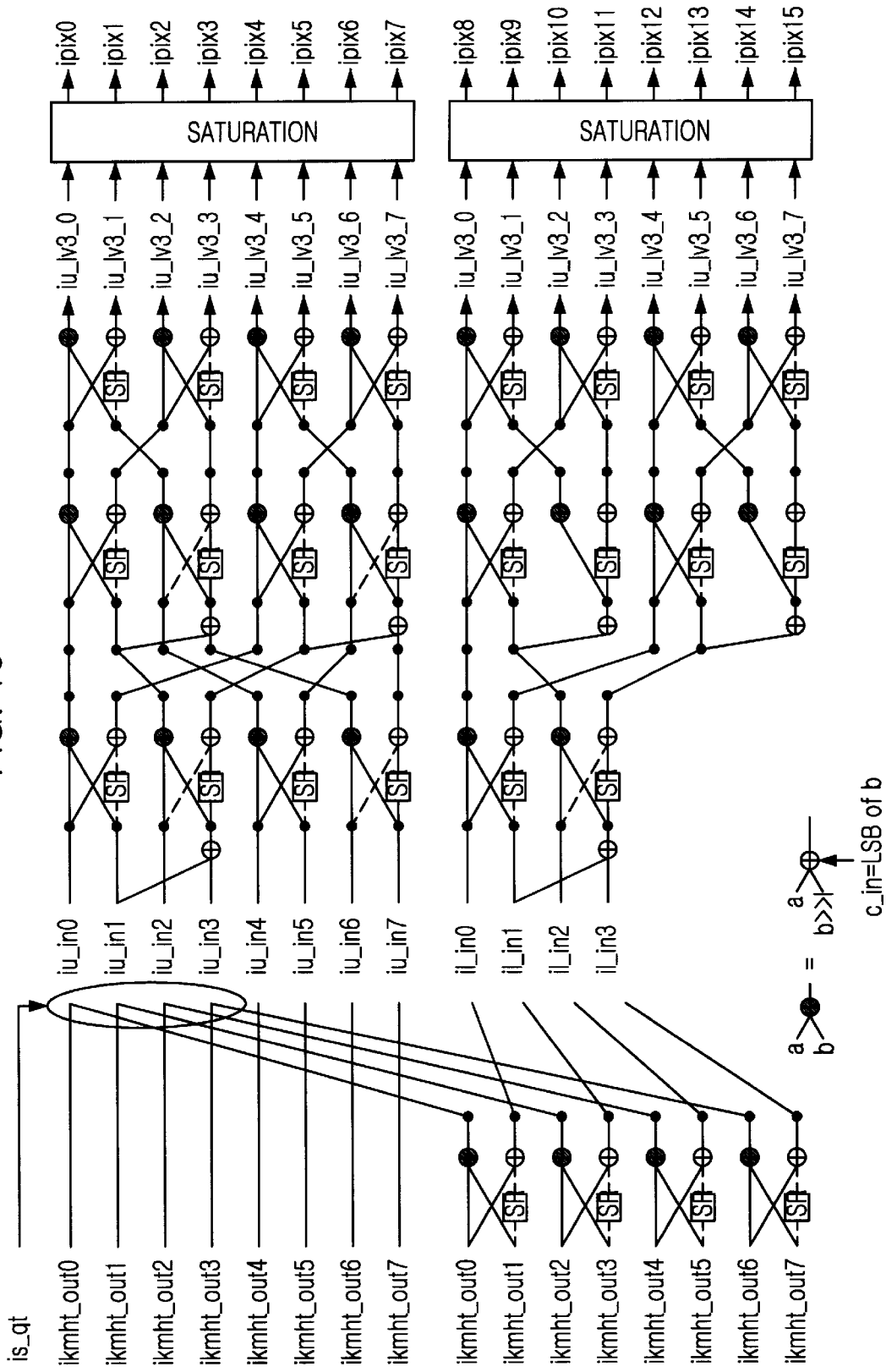
FIG. 16 is a diagram illustrating the inverse frequency transforming unit in the decompression hardware according to the present invention.

FIG. 16 is a diagram illustrating the inverse frequency transforming unit 1140 of the decompression hardware block diagram in FIG. 11. The inverse frequency transforming unit 1140 implements inverse process of the frequency transforming unit 420 in the compression hardware block diagram.

A total of eight frequency coefficients, which are the DC coefficient (ikmht_out0) of the coding unit 1120 and the AC coefficients (ikmht_out1~ikmht_out7) of the inverse quantization and inverse Rice mapping unit 1130, are inputted and pixels (ipix0~ipix15), representing space region, are obtained. Namely, eight pixels are obtained from eight frequency coefficients in the case of the 50% decompression. In the case of the 75% decompression, four '0s' are respectively joined to four frequency coefficients and the inverse transformation is performed so that eight pixels are obtained. Accordingly, a total of sixteen pixels are obtained for the eight frequency coefficients.

In the case of the 75% decompression, 2×8 inverse transformation is performed at one time and the transformed values are inputted into a first 1×8 inverse transforming unit and a second 1×8 inverse transforming unit. At this time, some adders and subtracters can be removed through optimizing the second 1×8 transforming unit so that elements configuring the hardware may be reduced. In FIG. 16, solid lines represents addition and dotted lines represents subtraction. Also, SR means bit shift right, that is, '1/2' operation.

Herein, two kinds of adders are used in the frequency inverse transformation. If the relative bit positions of the two inputs are identical, a first adder (adder filled with slashes) carries out the same addition as a general adder. If there is one bit difference, a larger value of data is right shifted to be same the number of bits. A second adder (adder not filled with slashes) right shifts the larger value to match the bit position and adds them. Because an error is caused due to the dropped LSB by a shift right, rounding is performed to reduce the error. In the rounding, the dropped LSB is processed as a carry input to the adder so that the average error becomes zero.

The inverse frequency transformed values may be deviated from the original pixels, which are from 0 to 255, due to a quantization error. As a saturation process is applied for the inverse frequency transformed values, the final pixels (ipix0~ipix15) can be obtained.

As the present invention integrates the quantization and Rice mapping process, the number of device elements necessary for hardware configuration is reduced and packing and unpacking processes are more rapidly performed so that speed necessary for compression and decompression of video frames is improved.

When the present invention is applied to a real hardware configuration, because operation is rapidly performed with small space, low cost for the hardware configuration may be realized and memory necessary for an image processing system may be reduced to ½ in the case of the 50% compression or ¼ in the case of the 75% compression so that system cost can be reduced.

Since the processing delay time is reduced in compression and decompression procedures by the rapid hardware configuration, the present invention may be applied to the conventional video processing hardware with little modification.

While the present invention has been described with respect to the particular embodiments, it will be apparent to those skilled in the art that various changes and modifications may be made without departing from the spirit and scope of the invention as defined in the following claims.

What is claimed is:

1. A system performing compression and decompression of a video frame, comprising:

a compression system, including:

input control means for aligning data, which will be compressed;

frequency transforming means for performing 1-dimensional and 2-dimensional frequency transformations for the aligned data in the input control means;

quantization and Rice mapping means for performing quantization and Rice mapping for the frequency transformed data;

bit count combination means for calculating bit count for the quantization values and for selecting the quantization values;

encoding means for performing Golomb-Rice (GR) coding for the quantization values and for packing the GR coded values and DC values into compression segments; and output control means for outputting the packed values, a decompression system, including:

decompression input control means for aligning data, which are stored in a memory and will be decompressed;

decoding means for unpacking the aligned data and for performing Golomb-Rice (GR) decoding for the unpacked data;

inverse quantization and inverse Rice mapping means for performing inverse quantization and inverse Rice mapping for the GR decoded data;

an inverse 1-dimensional and 2-dimensional frequency transformation for the inverse quantization and inverse Rice mapped data; and decompression output control means for outputting the desired pixels from the finally decompressed pixels obtained by the inverse frequency transformation.

2. The system as recited in claim 1, wherein the frequency transforming means includes:

a plurality of 1-dimensional frequency transforming units and 2-dimensional frequency transforming units performing addition and subtraction of each pixel data in parallel;

a compression selecting unit for determining compression ratio in response to a compression ratio control signal; and a frequency transformation output unit for outputting the frequency transformed data.

3. The system as recited in claim 1, wherein, in the quantization and Rice mapping means, the quantization and the Rice mapping are performed at the same region by adjusting the quantity of shifting.

4. The system as recited in claim 1, wherein the encoding means includes:

a comma inserting unit for inserting comma in data inputted for GR coding;

a barrel shifting unit for aligning the comma inserted data; and a bitwise OR'ing unit for bitwise OR'ing the aligned data.

5. The system as recited in claim 1, wherein the inverse frequency transforming means includes a plurality of inverse 1-dimensional frequency transforming units and inverse 2-dimensional frequency transforming units performing addition and subtraction of each pixel data in parallel.

6. The system as recited in claim 1, wherein the decoding means separates the GR codes in parallel by using a leading zero counter.

7. The system as recited in claim 1, wherein the inverse frequency transforming means includes a plurality of inverse 1-dimensional frequency transforming units and inverse 2-dimensional frequency transforming units performing addition and subtraction of each pixel data in parallel.

8. A system for performing compression of video frame, comprising:

input control means for aligning data, which will be compressed;

frequency transforming means for performing 1-dimensional and 2-dimensional frequency transformations for the aligned data in the input control means;

quantization and Rice mapping means for performing quantization and Rice mapping for the frequency transformed data;

bit count combination means for calculating bit count for the quantization values and for selecting the quantization values;

encoding means for performing Golomb-Rice (GR) coding for the quantization values and for packing the GR coded values and DC values into compression segments; and output control means for outputting the packed values.

9. The system as recited in claim 1, wherein the frequency transforming means includes:

a plurality of 1-dimensional frequency transforming units and 2-dimensional frequency transforming units performing addition and subtraction of each pixel data in parallel;

a compression selecting unit for determining compression ratio in response to a compression ratio control signal; and a frequency transformation output unit for outputting the frequency transformed data.

10. The system as recited in claim 1, wherein, in the quantization and Rice mapping means, the quantization and the Rice mapping are performed at the same time.

11. The system as recited in claim 1, wherein the encoding means includes:

a comma inserting unit for inserting comma in data inputted for GR coding;

a barrel shifting unit for aligning the comma inserted data; and a bitwise OR'ing unit for bitwise OR'ing the aligned data.

12. A system for performing decompression of video frame, comprising:

decompression input control means for aligning data, which are stored in a memory and will be decompressed;

decoding means for unpacking the aligned data and for performing Golomb-Rice (GR) decoding for the unpacked data;

inverse quantization and inverse Rice mapping means for performing inverse quantization and inverse Rice mapping for the GR decoded data;

inverse frequency transforming means for performing inverse 1-dimensional and 2-dimensional frequency transformation for the inverse quantization and inverse Rice mapped data; and decompression output control means for outputting the desired pixels from the finally decompressed pixels obtained by the inverse frequency transformation.

13. The system as recited in claim 1, wherein the decoding means separates the GR codes in parallel by using a leading zero counter.

14. A system performing compression and decompression of a video frame, comprising:

a compression system, including;

input control means for receiving and aligning data to be compressed;

frequency transforming means for performing 1-dimensional and/or 2-dimensional frequency transformations of the data received from the input control means;

quantization and Rice mapping means for performing quantization and Rice mapping the transformed data outputted from the frequency transformation means;

bit count combination means for calculating bit count for the quantized and Rice mapped data and for selecting one quantization value among the quantization values outputted from the quantization and Rice mapping means according to results of the bit count;

encoding means for performing Golomb-Rice (GR) coding for the quantized and Rice mapped data and for packing the GR coded values, a DC value and the quantization value into a compression segment; and output control means for outputting the packed values, a decompression system, including:

input control means for receiving data to be decompressed;

decoding means for unpacking the data and for performing Golomb-Rice (GR) decoding for the unpacked data;

inverse Rice mapping and inverse quantization means for performing inverse Rice mapping for the GR decoded data and performing inverse quantization for the inverse Rice mapped data;

inverse frequency transforming means for performing inverse 1-dimensional and/or 2-dimensional frequency transformation for the inverse Rice mapped and the inverse quantized data; and decompression output control means for outputting the desired pixels from the finally decompressed pixels obtained by the inverse frequency transformation.

15. The system as recited in claim 14, wherein the frequency transforming means includes:

a plurality of 1-dimensional frequency transforming unit and 2-dimensional frequency transforming units performing addition and subtraction of each pixel data in parallel;

a compression selecting unit for determining compression ratio in response to a compression ratio control signal; and a frequency transformation output unit for outputting the frequency transformed data.

16. The system as recited in claim 14, wherein, in the quantization and Rice mapping means, the quantization and the Rice mapping are performed at the same region by adjusting the quantity of shifting.

17. The system as recited in claim 14, wherein the encoding means includes:

a comma inserting unit for inserting comma in data inputted for GR coding;

a barrel shifting unit for aligning the comma inserted data; and a bitwise OR'ing unit for bitwise OR'ing the aligned data.

18. The system as recited in claim 14, wherein the inverse frequency transforming means includes a plurality of inverse 1-dimensional frequency transforming units and inverse 2-dimensional frequency transforming units performing addition and subtraction of each pixel data in parallel.

19. The system as recited in claim 14, wherein the decoding means separates the GR codes in parallel by using a leading zero counter.

* * * * *